Patented Oct. 18, 1938

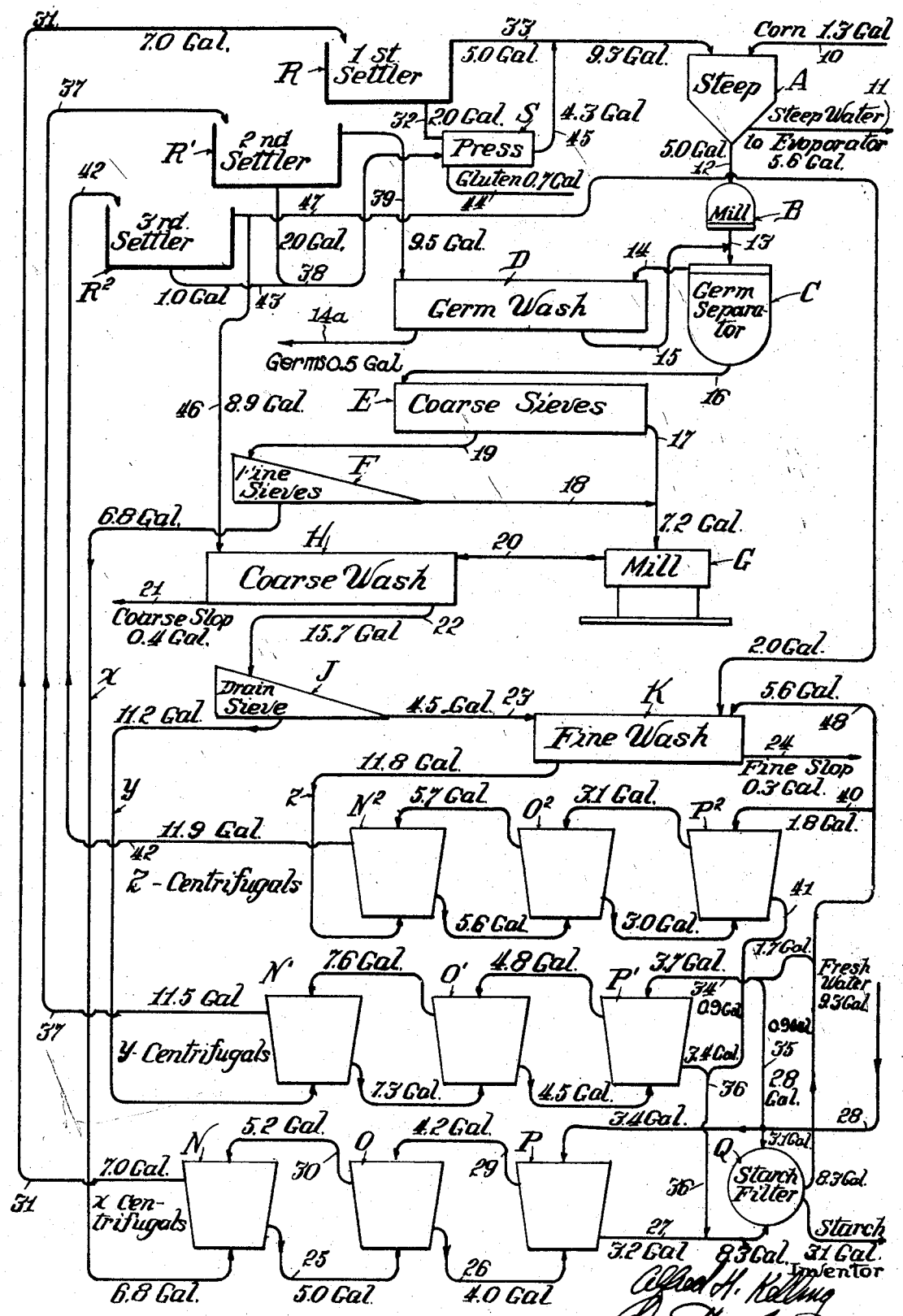

2,133,543

UNITED STATES PATENT OFFICE 2,133,543

MANUFACTURE OF STARCH

Alfred H. Kelling, Chicago, Ill., assignor, by mesne assignments, to Corn Products Refining Company, New York, N. Y., a corporation of New Jersey Application June 5, 1933, Serial No. 674,364

11 Claims. (Cl. 127—68)

This invention relates to the manufacture of starch and by-products from corn by the wet process.

The invention involves a modification of the starch making system shown in my copending application Serial No. 675,412 filed June 12, 1933 which discloses a closed system of making starch in which all of the process water (except that withdrawn from the steeps for evaporation to save solubles and that absorbed in the discharged insolubles, starch, gluten and bran) is used repeatedly in the process step by step progressively in counter-current to the course of the insolubles; with the result that all the solubles of the corn, as well as the insolubles, are ultimately recovered and there is no overflow of process water to the sewers and hence the danger of stream pollution from this source is avoided.

In the manufacture of starch from corn by the wet process the corn, after being steeped, is comminuted and subjected to separating operations in water to remove the germs, bran and fiber, these operations yielding, ordinarily, one or more streams of water carrying starch and gluten in suspension. The water will also contain that portion of the solubles not removed from the corn by the steeping operation, which enter the separating operations with the steeped corn. Where, as is customarily, although not necessarily, the case, there are three such streams of so called starch milk (water mixtures of starch and gluten) the stream which exists from the separating operations near the head end of the system, that is, from the stage of the process following closely after the steeping will have a larger soluble content and a larger quantity of impurities (impurities being mensurable approximately by soluble content) than the other two streams, the second stream to exit from the system having, similarly, a higher soluble content than the third one. According to the process of the pending application referred to, these three streams of starch milk, after elimination of water from one or more of them, are combined and sent through a series of centrifugal machines, into the last of which fresh water is introduced and through which the overflow, carrying with it the gluten, moves in one direction while the underflow, carrying the starch, moves in the other direction; both starch and gluten being discharged from the centrifugal system in suspension in water and the centrifugal process being preferably carried out so that the solubles and other impurities are concentrated with the gluten in the overflow, leaving the starch in a relatively high state of purity. The mode of operation, which is preferably the same in each centrifugal machine, is to introduce the fresh water, or relatively fresh water, into the underflow or starch zone in the centrifugal machine, so that by dilution, and apparently also by displacement, the solubles and other impurities are removed from the starch, in a large measure, and, through repetition of the centrifuging operation, are concentrated in the gluten stream issuing from the machine which the starch and gluten mixture first enters. The starch may then be washed, or not, as required, in the usual washing filters. The gluten and water mixture is dewatered, for example in the usual gluten settler, and the over-flow water from the settlers is introduced into the steeping system. This is the high soluble waste water and therefore is discharged directly from the process, through the steeps, without any of it being returned to the wet starch system. When a liquid high in impurities is returned to the wet starch system, some portion of it may circulate therethrough indefinitely, and thus prolong the micro-organic activity in the system with consequent increase of impurities in the starch. The products of micro-organic activity are apparently of a colloidal character which makes their removal from the starch difficult by any washing operation. It is advantageous, therefore, to discharge all of the high soluble water from the system directly through the steeps and, in re-using the waters of lower soluble content in the system, to use the stream containing more impurities at a point nearer the ultimate outlet of the system, the steeps, than the point of entry of the stream of minimum impurity content.

This principle of operation is the governing principle of the copending application referred to. The principle is carried out more fully by the present invention in accordance with which the three streams of starch, gluten and water are subjected to separate centrifuging operations.

The process is illustrated in the accompanying flow-sheet drawing, in which the apparatus is shown diagrammatically and consists of the following instrumentalities: A is a steep tank representing the usual multiple unit steeping system. B is a mill for coarse grinding the steeped corn and C a gravity separator for separating the germs from the rest of the corn, the germs being then washed of starch and gluten in the germ washing apparatus D and the de-germinated corn put through coarse sieves E and fine sieves F, the tailings from which are united and fine ground in mill G. The ground material from mill G is washed in the coarse washing apparatus H, the coarse slop (bran and fiber) being discharged from the system at this point and the liquid being caused to pass through drain sieves J, the tailings from which are washed in the fine washing apparatus K, from which the fine slop is discharged.

The stream of starch, gluten and water from the fine sieves F having the maximum soluble concentration passes through pipe $x$ to a series of centrifugals N, O, P, which, as a group are marked "$x$-centrifugals" on the drawing.

The starch milk stream from the drain sieve J, which is further along in the process and contains a smaller quantity of solubles, passes through the pipe $y$ to the "$y$-centrifugals" N', O', P'.

The starch milk from the fine wash K (which has the lowest soluble content of the three streams) passes through pipe $z$ to the "$z$-centrifugals" $N^2$, $O^2$, $P^2$.

The starch separated from the gluten in the three sets of centrifugals is, preferably, united and passed through a starch filter Q, (an optional feature of the invention) for de-watering the starch and, if need be, washing it with fresh water. The number of washing operations is optional. The drawing shows a single filter.

The connections between the apparatuses above referred to will be indicated in connection with the description of the operation of the process which follows:

It will be understood that the water balance figures (indicated by the numerals followed by the abbreviation "Gal.") are illustrative merely. The number of centrifugals in any series may be increased or decreased and one may use a plurality of starch filters in series or omit the starch washing entirely as circumstances require. The term "pipe" used for convenience is to be understood as including any appropriate conduit, conveyor or other means of conducting the material from point to point in the system.

*Option.*—The corn containing 1.3 gallons per bushel of corn ground (all water balance figures being on this basis) is introduced into the steeps A at 10 and the steep water, 5.6 gallons, is drawn off to the evaporator (not shown) through pipe 11. The steeped corn containing 5.0 gallons of water passes through pipe 12 to the mill B, and the material coarsely ground in the mill goes through pipe 13 to the germ separator C. The germs are floated off through pipe 14 to the germ wash D and the germs, carrying 0.5 gallon of water are discharged from the system at 14a. The liquid from the germ wash is returned to the separator C through pipe 15 to supply the necessary separating medium. The degerminated corn passes through pipe 16 to the coarse sieves E and from there through pipe 17 to the mill G which also receives, through pipe 18, the tailings or grits, from the fine sieves F through which passes, from pipe 19, the liquid separated by the water in the coarse sieving operations at E; the combined streams in pipe 17 amounting to 7.2 gallons. The ground material passes through pipe 20 to the coarse washing apparatus H which also ordinarily consists of copper reels or shakers. The coarse slop goes out of the coarse washing apparatus at 21 containing 0.4 gallon of water. The liquid from the coarse wash passes through pipe 22 to the drain sieve J, the water content being 15.7 gallons, and the tailings from sieve J, containing 4.5 gallons of water passing to the fine wash K through pipe 23. The fine washing apparatus K consists ordinarily of reels or shakers covered with silk bolting cloth. The fine slop goes out of apparatus K at 24 carrying 0.3 gallon of water.

By the separating operations just described, a separation is made of the germs, bran and fiber from the starch and gluten, these operations yielding three starch, gluten and water mixtures of different soluble content. The high soluble stream issues from the fine sieves F and passes through a line $x$ to the first centrifugal N of the $x$-centrifugals, and consists of 6.8 gallons. The underflow from centrifugal N, which is a starch stream, to the extent that the separation is carried out in this machine, passes through pipe 25 to centrifugal O, and contains 5.0 gallons of water. The underflow from centrifugal O, consisting of 4.0 gallons, passes through pipe 26 to centrifugal P. The underflow from centrifugal P, carrying 3.2 gallons of water, goes through pipe 27 to the starch filter Q. 9.3 gallons of fresh water enters the system through pipe 28, of which 3.4 gallons goes to the centrifugal P. The overflow from centrifugal P, 4.2 gallons, passes through pipe 29 to the underflow zone of centrifugal O and the overflow from centrifugal O, 5.2 gallons, passes through pipe 30 to the underflow zone of centrifugal N. In this manner the solubles are concentrated in the overflow that is with the gluten. The overflow from centrifugal N, 7.0 gallons, which of all the waters is the highest in solubles, passes through pipe 31 to the gluten settler R, where the gluten subsides and is ultimately drawn off, carrying 2.0 gallons, through pipe 32 to the gluten press S. The overflow water from the settler R passes through pipe 33 to the steeps A, the amount being 5.0 gallons.

The $y$ stream from the drain sieve J consisting of 11.2 gallons passes into the first $y$-centrifugal N' and thence through the series of centrifugals. The washing fluid for centrifugal P' consists of 3.7 gallons made up of 0.9 gallon of starch filtrate through pipe 34 and 2.8 gallons of fresh water through branch pipe 35. The starch underflow, 3.4 gallons, from centrifugal P' passes through pipe 36 to pipe 27 and thence to the starch filter Q. The overflow from the centrifugal $N^1$ passes through pipe 37, the amount being 11.5 gallons, to the second settler R'. The gluten from the second settler filter R', carrying 2.0 gallons of water, passes through pipe 38 to the press S. The overflow from settler R', 9.5 gallons, passes through pipe 39 to the germ wash D.

The $z$ stream of starch milk from the fine wash K, 11.8 gallons, passes into the centrifugal machine $N^2$, through pipe $z$. Wash water is supplied to centrifugal $P^2$ from starch filter Q through branch pipe 40, the amount being 1.8 gallons. The underflow from centrifugal $P^2$, 1.7 gallons, flows through pipe 41 and pipes 36, 27 to the starch filter Q. The overflow from centrifugal $N^2$, 11.9 gallons flows through pipe 42 to the third settler $R^2$. The gluten from settler $R^2$, containing 1.0 gallon of water, passes through pipe 43 and pipe 38 to the press S. The gluten leaves the press at 44 containing 0.7 gallon of water. 4.3 gallons of press water goes through pipe 45 and pipe 33 to the steeps, making, with the first settler overflow, 9.3 gallons. The overflow from the third settler $R^2$ is divided, 8.9 gallons going through pipe 46 to the coarse wash H, and 2.0 gallons going through the pipe 47 to the fine wash K. The fine wash K also receives 5.6 gallons through a branch pipe 48 of the starch filtrate pipe 34.

By this arrangement the concentration of the starch and gluten streams in separate concentrators is obviated and each stream is separately centrifuged, which gives a higher soluble concentration in the x stream going through the first settler and to the steeps, thereby minimizing the contamination of the wet starch system by solubles and other impurities.

I do not claim herein the invention common to this and my copending application Serial No. 675,412 above referred to; the generic claims for the common invention being claimed in the other application. I wish to be understood however as claiming all modifications within the scope of the appended claims.

I claim:

1. In the process of manufacturing starch from corn comprising steeping the corn, comminuting it and subjecting it to separating operations in water, yielding two or more mixtures of starch, gluten and water having different impurity contents: the improvement which consists in separately centrifuging each such mixture to remove gluten and water from the same; eliminating water from the gluten; using the water eliminated from the gluten and water mixture containing the highest impurity content for steeping corn as the operations are continued on fresh material; and using the rest of the water for separating operations on the comminuted corn.

2. In the process of manufacturing starch from corn comprising steeping the corn, comminuting it and subjecting it to separating operations in water, yielding two or more mixtures of starch, gluten and water having different impurity contents; the improvement which consists in separately subjecting each such mixture to a series of centrifuging operations in which the gluten suspended in water is moved in one direction and the starch in the other; using the water eliminated from the gluten and water suspension containing the highest impurity content for steeping corn as the operations are continued on fresh material; and using the rest of the water for separating operations on the comminuted corn.

3. In the process of manufacturing starch from corn comprising steeping the corn, comminuting it and subjecting it to separating operations in water, yielding two or more mixtures of starch, gluten and water having different impurity contents: the improvement which consists in subjecting each such mixture separately to a series of centrifuging operations in which the overflow carrying the gluten moves in the opposite direction from the underflow carrying the starch, the overflow from one operation entering the underflow zone of a prior operation of the series, and fresh water is introduced into the underflow zone of the last operation; eliminating water from the gluten; using the water eliminated from the gluten and water stream containing the highest impurity content for steeping corn as the operations are continued on fresh material; and using the rest of the water for separating operations on the comminuted corn.

4. In the process of manufacturing starch from corn comprising steeping the corn, comminuting it and subjecting it to separating operations in water, yielding two or more mixtures of starch, gluten and water having different impurity contents: the improvement which consists in centrifuging each such mixture, separately, to remove gluten, water and the major portion of the solubles from the starch; eliminating the water from the gluten; using the water eliminated from the gluten and water mixture containing the highest impurity content for steeping corn as the operations are continued on fresh material; and using the rest of the water for separating operations on the comminuted corn.

5. In the process of manufacturing starch from corn comprising steeping the corn, comminuting it and subjecting it to separating operations in water, yielding two or more mixtures of starch, gluten and water having different impurity contents: the improvement which consists in separately subjecting each such mixture to a series of centrifuging operations in which the gluten suspended in water is moved in one direction and the starch in the other and into the last of which fresh water is introduced; eliminating water from the gluten; using water eliminated from the gluten and water suspension mixture containing the highest impurity content for steeping corn as the operations are continued on fresh material; and utilizing the rest of the water for separating operations on the comminuted corn.

6. In the process of manufacturing starch from corn comprising steeping the corn, comminuting it and subjecting it to separating operations in water, yielding two or more mixtures of starch, gluten and water containing different contents of solubles: the improvement which consists in separately subjecting each such mixture to a series of centrifuging operations in which the overflow carrying the gluten moves in the opposite direction from the underflow carrying the starch, the overflow from one operation entering the underflow zone of a prior operation of the series and in which fresh water is introduced into the starch zone of the last operation; washing the starch with fresh waters; and utilizing waters eliminated from said mixtures and water used for washing the starch in preceding steps of the process of manufacture as applied to subsequently treated material.

7. In the process of obtaining starch from corn in which the corn is steeped, comminuted and subjected in water to germ, coarse slop and fine slop separations: the improvement which consists in separately centrifuging the starch milk from said separating operations for removal of the gluten from the starch; reusing the resultant process water having the highest impurity content in the steeping operation; and reusing the other process waters in the separating operations.

8. In the process of obtaining starch from corn in which the corn is steeped, comminuted and subjected in water to germ, coarse slop and fine slop separating operations, yielding separate mixtures of starch, gluten and water: the improvement which consists in separately centrifuging said mixtures to remove the gluten and some of the water from the starch; dewatering the gluten; using the gluten water derived from the mixture from the germ separation for steeping corn, as the process proceeds; and using the gluten water from the other mixtures in the separating operation.

9. In the process of obtaining starch from corn in which corn is steeped, comminuted and subjected in water to germ, coarse slop and fine slop separating operations, yielding separate mixtures of starch, gluten and water: the improvement which consists in separately centrifuging said mixtures to remove the gluten and some of the water from the starch; dewatering the gluten; using the gluten water derived from the mixture from the germ separation for steeping corn, as the process proceeds; reusing the gluten water derived from the mixture from the coarse slop separation in the germ separation; and reusing the gluten water derived from the mixture from the fine slop separation in the coarse and fine slop separations.

10. In the process of obtaining starch from corn in which the corn is steeped, comminuted and subjected to separating operations in water yielding mixtures of starch and gluten having different contents of impurities, and in which substantially all process waters, except steep water and water absorbed in the discharge solids, are reused in the process: the improvement which consists in centrifuging said mixtures separately to remove the gluten and some of the water from the starch; dewatering the gluten; reusing for steeping corn, as the process proceeds, the gluten water having the highest impurity content; and reusing for said separating operations, the rest of the gluten water.

11. The process of obtaining starch from corn which comprises: steeping the corn; comminuting the steeped corn; subjecting the comminuted corn in water to a series of separating operations for removal of germs and slop, yielding mill starch streams containing different contents of solubles; separately centrifuging said mill starch streams to remove the gluten and major portion of the water from the starch; removing the water from the gluten and reusing the gluten water having the highest content of solubles for steeping corn, as the process proceeds, and the other gluten waters in the part of the process following the steeping at stages which are more or less near the steeping operation in accordance with the proportionate quantities of solubles in said gluten waters.

ALFRED H. KELLING.